United States Patent
Do et al.

(10) Patent No.: US 8,666,011 B1
(45) Date of Patent: Mar. 4, 2014

(54) JITTER-ATTENUATED CLOCK USING A GAPPED CLOCK REFERENCE

(75) Inventors: Viet Do, Carlsbad, CA (US); Simon Pang, San Diego, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 208 days.

(21) Appl. No.: 13/091,052

(22) Filed: Apr. 20, 2011

(51) Int. Cl.
*H04L 7/00* (2006.01)

(52) U.S. Cl.
USPC ........... 375/372; 375/354; 375/370; 375/371; 375/373; 375/376

(58) Field of Classification Search
USPC .................. 375/372, 354, 370, 371, 373, 376
See application file for complete search history.

(56) References Cited

U.S. PATENT DOCUMENTS

| | | | | |
|---|---|---|---|---|
| 4,397,017 A | * | 8/1983 | Rokugo .................... | 370/506 |
| 4,596,026 A | * | 6/1986 | Cease et al. ............... | 375/372 |
| 4,791,652 A | * | 12/1988 | McEachern et al. ......... | 375/362 |
| 5,111,485 A | * | 5/1992 | Serack .................... | 375/363 |
| 5,119,406 A | | 6/1992 | Kramer | |
| 5,157,655 A | | 10/1992 | Hamlin, Jr. et al. | |
| 5,471,511 A | | 11/1995 | De Langhe et al. | |
| 6,088,413 A | * | 7/2000 | Autry et al. ............... | 375/372 |
| 6,501,809 B1 | * | 12/2002 | Monk et al. ............... | 375/363 |
| 6,927,716 B2 | | 8/2005 | Keaveney et al. | |
| 7,203,227 B1 | * | 4/2007 | Currivan et al. ............ | 375/222 |
| 8,090,066 B2 | * | 1/2012 | Ji et al. ................... | 375/372 |
| 2002/0021719 A1 | * | 2/2002 | Acimovic ................. | 370/518 |
| 2003/0228150 A1 | * | 12/2003 | Dave ...................... | 398/98 |
| 2007/0183551 A1 | * | 8/2007 | Ji et al. ................... | 375/372 |
| 2007/0291888 A1 | * | 12/2007 | Mateosky et al. ........... | 375/372 |
| 2010/0192003 A1 | * | 7/2010 | Weizeorick et al. ......... | 713/500 |

OTHER PUBLICATIONS

Silicon Labs, AN561, "Introduction to Gapped Clocks and PLLs" Rev. 0.1, 2010.

* cited by examiner

*Primary Examiner* — Kenneth Lam (57) ABSTRACT

A system and method are provided for generating a jitter-attenuated clock using an asynchronous gapped clock source. The method accepts a first reference clock having a first frequency. Using the first reference clock, an asynchronous gapped clock is generated having an average second frequency less than the first frequency. A dynamic numerator (DN) and dynamic denominator (DD) are iteratively calculated for the gapped clock. Then, DN and DD are averaged. In response to the averaging, an averaged numerator (AN) and an averaged denominator (AD) are generated. Finally, the first frequency (first reference clock) is multiplied by the ratio of AN/AD to create a jitter-attenuated second clock having the second frequency.

18 Claims, 7 Drawing Sheets

JITTER-ATTENUATED CLOCK USING A GAPPED CLOCK REFERENCE

BACKGROUND OF THE INVENTION

1. Field of the Invention

This invention generally relates to a digital communication system and, more particularly, to a system and method for generating a jitter-attenuated clock from a gapped clock source.

2. Description of the Related Art

As noted in Silicon Laboratories Application Note AN561, synchronous networks have a hierarchical approach to distributing network timing. They do this by establishing a timing master and slaving the various sub networks and nodes to the master. This approach has met with success for SONET/SDH and packet-based wide area networks.

In contrast, local area networks tend to generate timing locally and slave the immediate receiver's timing to the transmit timing of the driving node. The transmitting node's timing is often completely asynchronous to the timing of its receiver. Two examples of these two distinct approaches are SONET and Ethernet, though neither uses purely a single approach.

SONET typically synchronizes everything to one timing master and distributes timing in a hierarchical manner. However, transport paths can experience jitter and wander with magnitudes that can be greater than one UI (unit interval or the period of the clock frequency), while some payloads cannot be made synchronous and must remain plesiochronous.

The solution that SONET has adopted is payload pointers, which embed the frame slip information into the overhead portion of the SONET frame. Pointer processing is a very effective method of embedding plesiochronous payloads in synchronous SONET frames, but as the SONET data rates have increased over the year, pointer processing has become more and more difficult to implement in FPGAs and ASICs.

Conventionally, every Ethernet transmitter runs at a rate that is determined by its local and individual timing source, which is usually a crystal oscillator, a free running clock with +100 ppm accuracy. The receiving node slaves its timing to the transmitting source using the isochronous timing information that is embedded in the Ethernet data stream. This approach is both efficient and inexpensive. However, one consequence is that timing mismatches between the various asynchronous nodes can accumulate and result in bit errors and dropped packets. This is not a serious issue for the data payloads that Ethernet is intended to carry because the higher level IP protocols implement frame error detection and retransmission. However, as voice payloads have become more common, the situation is more complicated because packet retransmission interrupts the steady flow required for good voice sound quality. Synchronous Ethernet (SyncE) and Timing Over Packet (IEEE-88) are two methods of distributing synchronization through packet networks so that they can interoperate with conventional circuit switches services, such as SONET/SDH.

The solution that is used by OTN/OTU is a compromise between SONET and Ethernet in that it is specifically designed to accept plesiochronous payloads and efficiently place them in containers that are ready for optical transmission over long distances. The timing master for an OTN/OTU node can be asynchronous, and the OTN/OTU wrapper can accept payloads from a variety of sources. It is quite common for OTN/OTU systems to use gapped clocks to achieve these goals.

Figure 1:
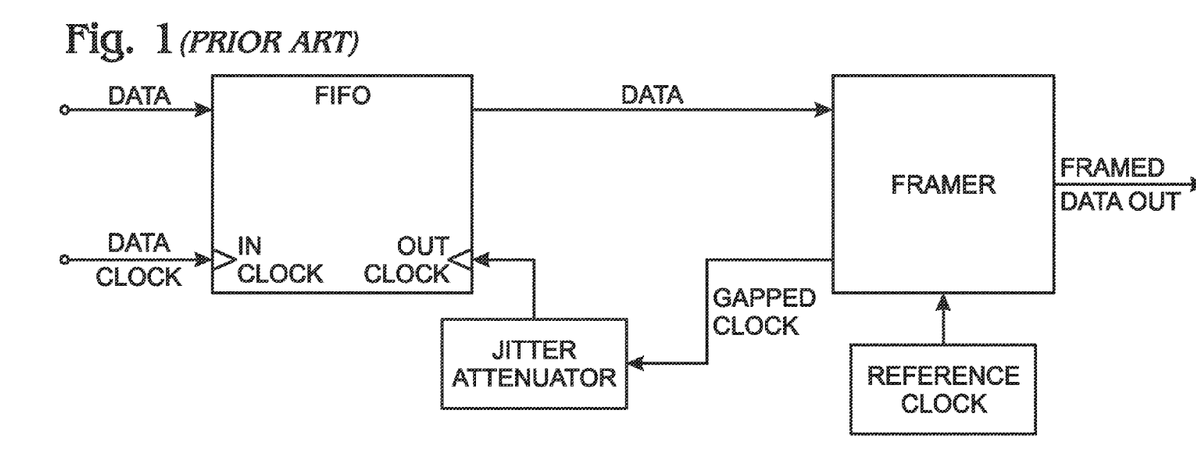
FIG. 1 is a schematic block diagram depicting a transmitter using a gapped clock (prior art).

FIG. 1 is a schematic block diagram depicting a transmitter using a gapped clock (prior art). Gapped clocks are periodic clock signals of a single clock frequency that have clock pulses removed from their stream. Well-formed gapped clocks do not have reduced width pulses (known as runt pulses). Rather, each individual clock pulse is either completely present or completely absent. In a typical application, one in N clock pulses is removed, where N can be a constant or can be constrained to be within a range of values. Advantageously, the reference frequency can be used to create the gapped clock, varying the gapped clock frequency in response to the number of removed clock pulses, at the cost of some irregular periods (gaps) between clock pulses.

As shown in FIG. 1, the data source is plesiochronous with respect to the transmission output rate. That is, the fixed clock can be implemented with an XO or a TXCO that is not locked to anything, including the data source dock. The data source clock and data go into a FIFO so that data comes in at a uniform rate, and is clocked out of the FIFO with a clock that is aperiodic, i.e. gapped.

The purpose of the framer is to add FTC (forward error correction), framing, and other overhead bits that are needed to create a wrapper that conforms to whatever convention or protocol is in use. For this to function properly, the output clock rate must be higher than the data source clock rate because bits are being added to the stream.

Figure 2:
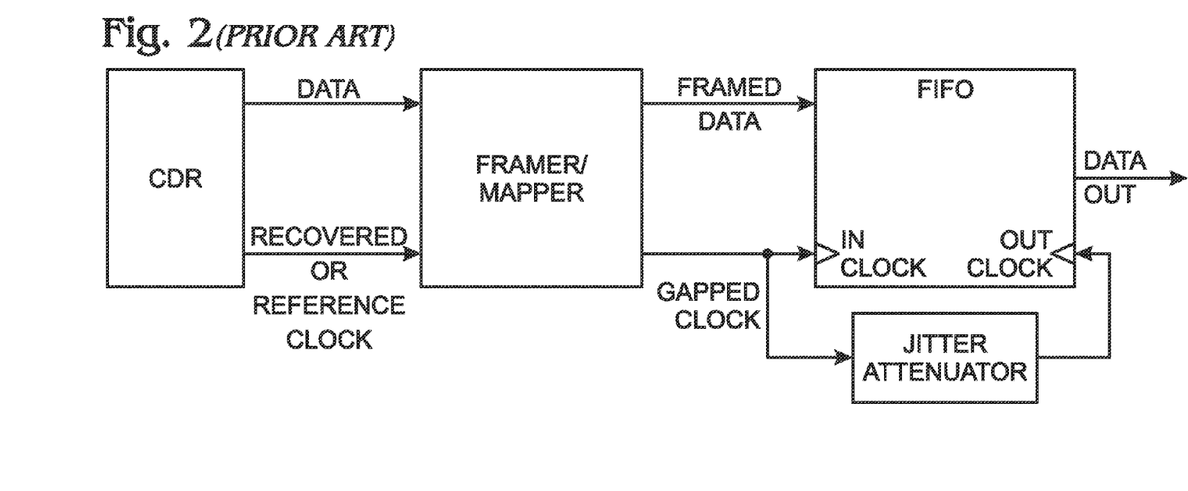
FIG. 2 is a schematic block diagram of a Clock Data Recovery (CDR) receiver using a gapped clock (prior art).

FIG. 2 is a schematic block diagram of a Clock Data Recovery (CDR) receiver using a gapped clock (prior art). The CDR separates the isochronous data stream into clock and data signals. Since the input clock to the FIFO only occurs for payload bits, only the payload bits enter the FIFO. The FIFO input clock is not strictly periodic (by virtue of it being gapped). Since downstream consumers of the output data are not usually tolerant of gapped clocks, a jitter attenuator is used to create a clock output that has the same average frequency as the gapped clock with less jitter. The use of a jitter attenuator in the systems of FIGS. 1 and 2 adds considerably to their expense and size.

It would be advantageous if a means existed for creating a jitter-attenuated clock from a gapped clock source.

SUMMARY OF THE INVENTION

Described herein is a system and method for dynamically acquiring integer derivatives of a positive, negative, or a positive/negative combination gapped clock frequency, which may for example, be used with a phase-locked loop (PLL) to enable jitter attenuation. Such a system is useful in a synchronizer/desynchronizer with synchronous/asynchronous mapping/demapping for communication applications. Therefore, complex mapping/demapping protocols can be implemented.

Accordingly, a method is provided for generating a jitter-attenuated clock using an asynchronous gapped clock source. The method accepts a first reference clock having a first frequency. Using the first reference clock, an asynchronous gapped clock is generated having an average second frequency less than the first frequency. A dynamic numerator (DN) and dynamic denominator (DD) are iteratively calculated for the gapped clock. Then, DN and DD are averaged. In response to the averaging, an averaged numerator (AN) and an averaged denominator (AD) are generated. Finally, the first frequency (first reference clock) is multiplied by the ratio of AN/AD to create a jitter-attenuated second clock having the second frequency.

The first reference clock is accepted as a sequence of frames, where each frame includes (n) clock cycles. The gapped clock is generated by dividing (n) by an integer number (x) of instantaneous gap clock periods (IGCPs), where the total number of clock gaps in the (x) IGCPs is (m). A divided clock is generated with a uniform minimum divide period of (MD), and DN is found by calculating:

$$(x)(MD)+(m)=(n), \text{ when } (x)(MD) \geq n; \text{ and,}$$

$$(x)(MD)-(m)=(n), \text{ when } (x)(MD) < n.$$

DN is iteratively calculated by finding the difference between (n) and (m) for each frame. DD is iteratively calculated by finding (n) for each frame.

Additional details of the above-described method, and clock device with a system for generating a jitter-attenuated clock using an asynchronous gap clock generator, are provided below.

DETAILED DESCRIPTION

Figure 3:
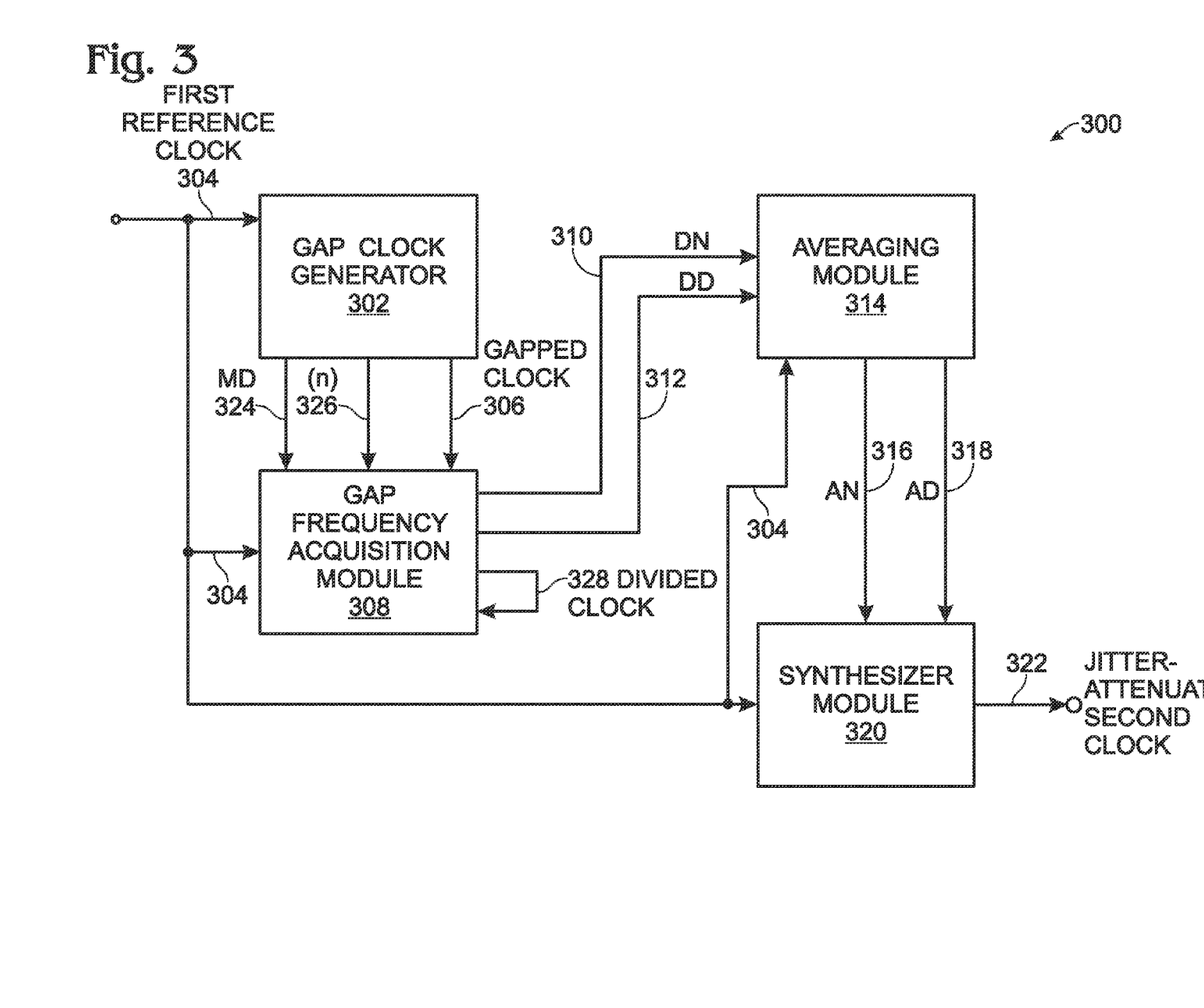
FIG. 3 is schematic block diagram of a clock device with a system for generating a jitter-attenuated clock using an asynchronous gap clock generator.

FIG. 3 is schematic block diagram of a clock device with a system for generating a jitter-attenuated clock using an asynchronous gap clock generator. The system 300 comprises a gap clock generator 302 having an input on line 304 to accept a first reference clock having a first frequency. The gap clock generator 302 has an output on line 306 to supply an asynchronous gapped clock with an average second frequency less than the first frequency. The system is not limited to any particular means of generating a gapped clock. A gap frequency acquisition module 308 has an input on line 306 to accept the gapped clock. The gap frequency acquisition module 308 has outputs on line 310 and 312 to respectively supply an iteratively calculated dynamic numerator (DN) and an iteratively calculated dynamic denominator (DD) for the gapped clock.

An averaging module 314 has inputs on lines 310 and 312 to accept the DN and DD, and outputs on lines 316 and 318 to respectively supply an averaged numerator (AN) and an averaged denominator (AD). A synthesizer module 320 has inputs on lines 316 and 318 to accept AN, AD, and the first frequency clock on line 304. The synthesizer module 320 multiplies the first frequency by a ratio AN/AD to supply a jitter-attenuated second clock on line 322 having the second frequency. A jitter-attenuated clock is defined herein as having a uniform clock pulse period, or a uniform spacing between clock pulses.

In one aspect, the gap clock generator 302 accepts a first reference clock with a frame of (n) clock cycles, and generates the gapped clock by dividing (n) by an integer number (x) of instantaneous gap clock periods (IGCPs), where the total number of clock gaps in the (x) IGCPs is (m). Typically, the frequency of the gapped clock is unknown (not predetermined). It is also typical that that gapped clock pulses do not occur in predetermined patterns or locations in a frame. In some aspect, the value of (n) is predetermined and remains constant. However, the value of n may be non-predetermined, and in some aspects may vary from frame-to-frame.

In one aspect, the averaging module 314 accumulates values of DN and DD over a plurality of (s) frames, and divides the accumulated values by (s). For example, the averaging module can be a first-in first-out (FIFO) memory having the capacity for at least (s) number of DN and DD values, together with calculation logic capable of summing the DN values and dividing by (s). Likewise, the calculation logic would be capable of summing the DD values and dividing by (s).

In another aspect, the gap clock generator 302 has an output on line 324 to supply a uniform minimum divide period of (MD), and an output on line 326 to supply the value of (n) for each frame. The gap frequency acquisition module 308 generates a divided clock on line 328 with the uniform minimum divide period (MD). Then, the gap frequency acquisition module 308 calculates:

$$(x)(MD)+(m)=(n), \text{ when } (x)(MD) \geq n; \text{ and,}$$

$$(x)(MD)-(m)=(n), \text{ when } (x)(MD) < n.$$

More explicitly, the value DN is iteratively calculated for each frame by finding the difference between (m) and (n). The value DD is iteratively calculated by determining (n) for each frame. It should be understood that the system 300 is not necessarily required to generate or use the divided clock, as there are other means of determining the value of (m).

In one aspect, the gap clock generator 302 supplies a positive gapped clock having a lower frequency than the divided clock. The gap frequency acquisition module 308, over the period of a frame, finds a difference in first reference clock pulses between each IGCP and a corresponding MD, and sums the differences to obtain the value (m). Examples of positive and negative gapped clocks are presented in detail below. Alternatively, if the gap clock generator 302 supplies a negative gapped clock having a higher frequency than the divided clock, the gap frequency acquisition module 308, over the period of a frame, finds a difference in first reference clock pulses between each IGCP and a corresponding MD, and sums the differences to obtain the value (m).

In another aspect, the gap clock generator 302 supplies a gapped clock with negative gapped clock portions having a higher frequency than the divided clock, and positive gapped clock portions with a lower frequency than the divided clock. Then, the gap frequency acquisition module 308, over the period of a frame, finds a first difference sum in first reference clock pulses between each negative gapped clock portion IGCP and a corresponding MD. The gap frequency acquisition module also finds a second difference sum between each positive gapped clock portion IGCP and a corresponding MD, and subtracts the first difference from the second difference to obtain the value (m).

Functional Description

The gapped clock generator 302 receives a low jitter clock (e.g., from a CDR recovery clock) to generate a gapped clock for a synchronizer or a desynchronizer by compressing or removing a number of clock edges within a frame according to mapping/demapping protocols. The timing events of compressing or removing clock edges within a frame can be fixed (synchronous) or random (asynchronous). The gapped clock is derived from the first reference clock, with the fundamental frequency of gapped clock being equal the frequency of the first clock divided by the minimum division (MD). The frame size is the number of clock cycles (n) within a frame, or between two back-to-back Start of Frame (SOF) signals. In some aspects, the SOF signal may be used to indicate the start of a new frame.

As noted above, gapped clock may be asynchronously derived from the first reference clock. As the result, there is no guarantee of a fixed relationship between the first reference clock and the gapped clock. Therefore, it is necessary to acquire the gapped frequency dynamically, as defined by the values DN and DD.

Figure 4:
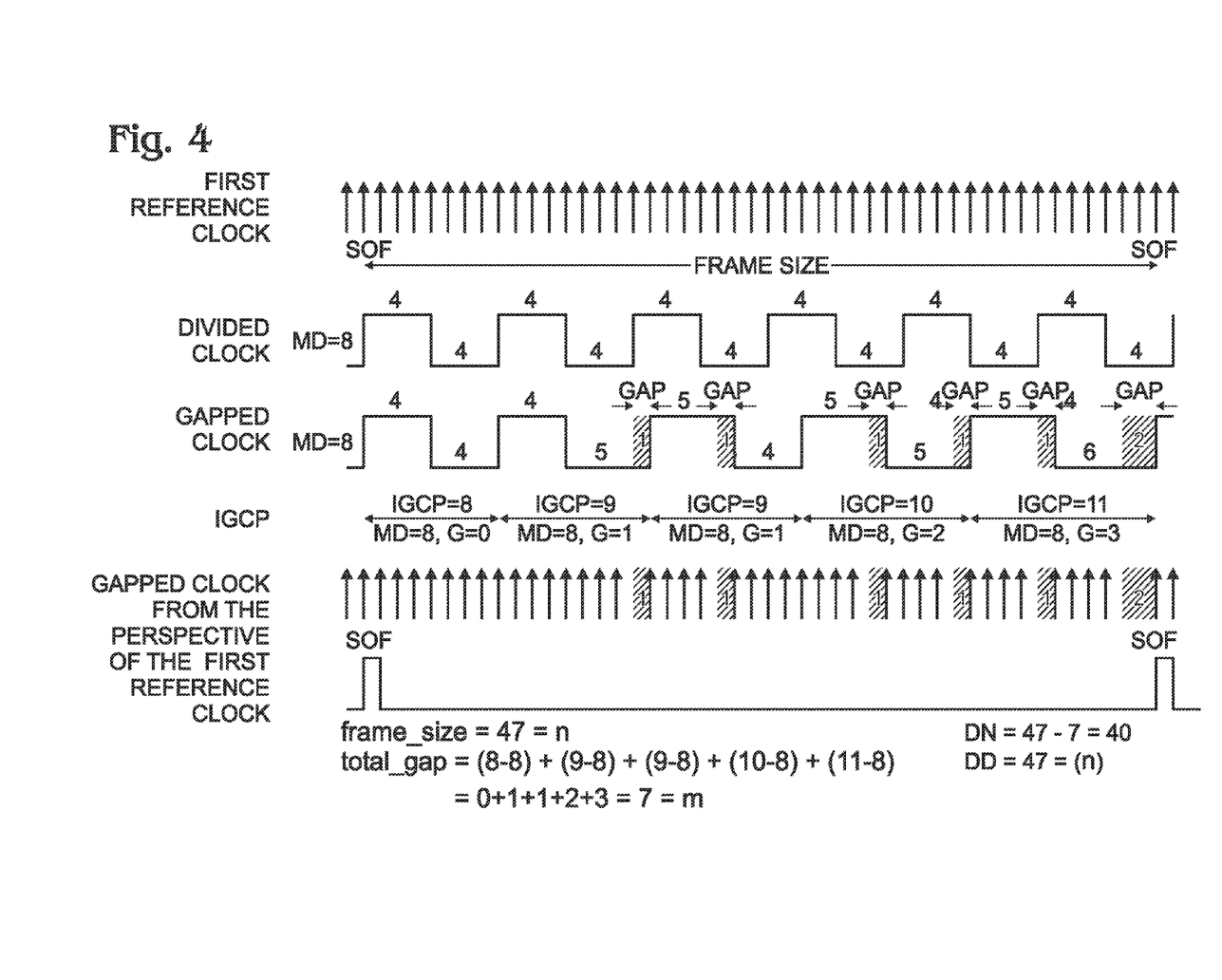
FIG. 4 is a timing diagram depicting the generation of a positive gapped clock.

FIG. 4 is a timing diagram depicting the generation of a positive gapped clock. The divide clock is divided by the minimum divide (MD) period of 8 first reference clock cycles. The divide clock may be used to generate the gapped clock, where a positive gap is asserted into either the duty cycle High or Low of the divide clock. Therefore, each IGCP is extended by a positive gap=IGCP=MD. From the first reference clock point of view, the gapped clock is created by dropping a number of clock edges, which causes the gapped clock to be slower than the divide clock. By counting the number of gapped clock rising edges in a frame, and knowing the value of (n), the total gap (m) can be calculated. Clearly, the total gap (m) is the sum of the difference between each IGCP and its corresponding MD.

Definition: Dynamic Numerator (DN)=(n)−(m);
Definition: Dynamic Denominator (DD)=(n).

If the synthesizer module (320 of FIG. 3) is enabled as a phase-locked loop (PLL) for example, the divide ratio DN/DD is equal to the second clock frequency divided by the first clock frequency. However, since all the gaps have been filtered/distributed by the averaging module or low pass filter 314, the second clock jitter is very low.

Figure 5:
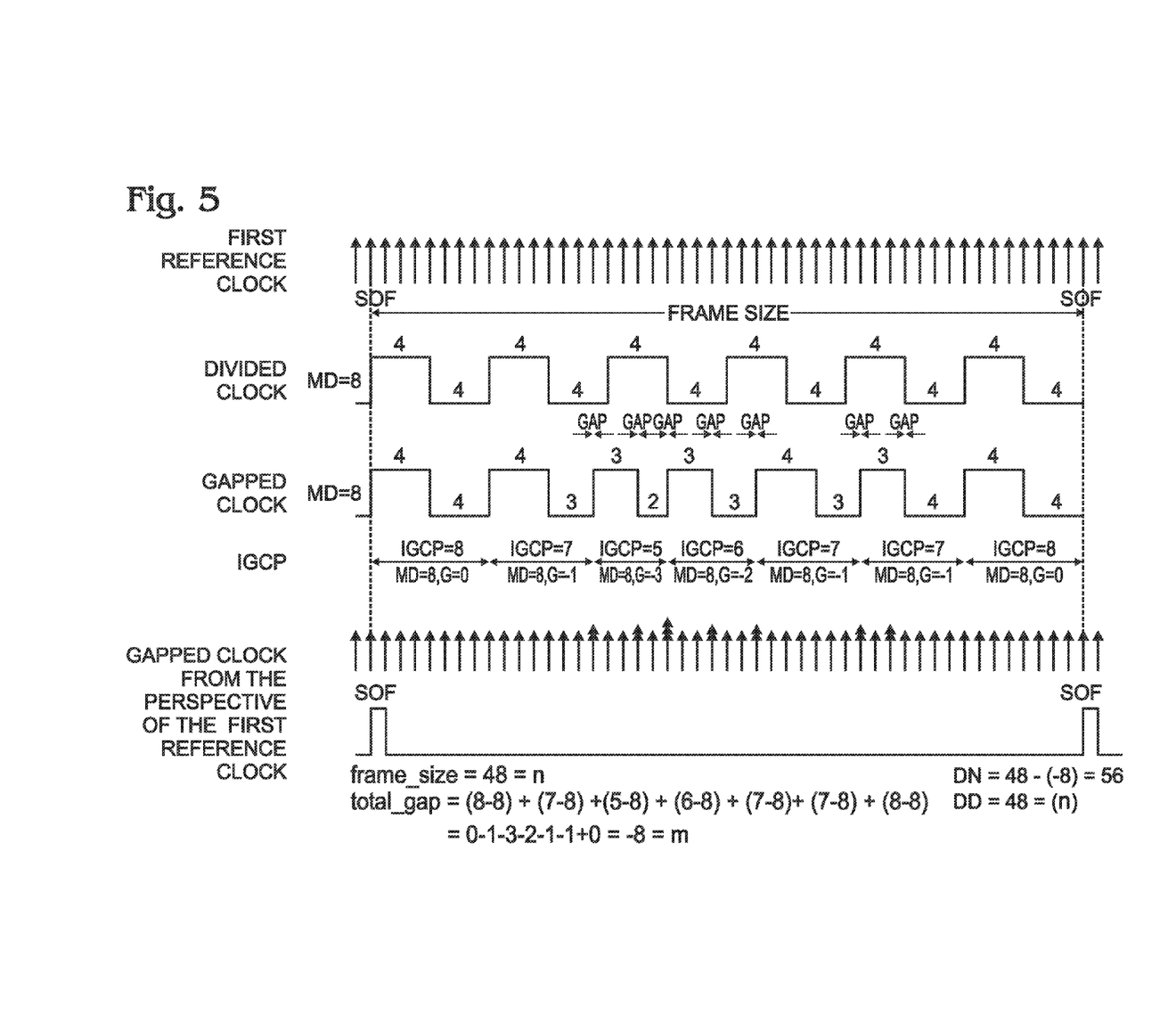
FIG. 5 is a timing diagram depicting the generation of a negative gapped clock.

FIG. 5 is a timing diagram depicting the generation of a negative gapped clock.

Figure 6:
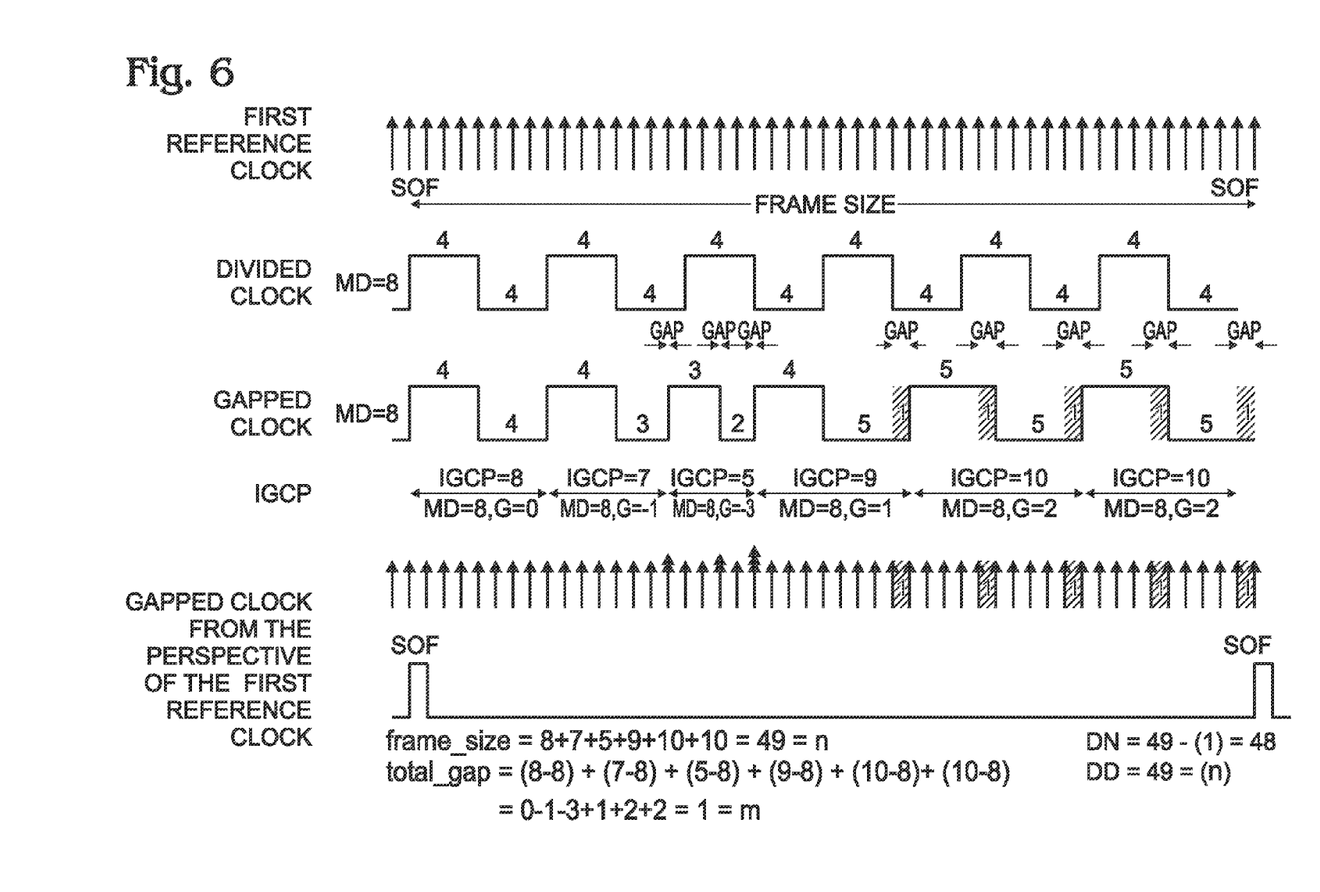
FIG. 6 is a timing diagram depicting the generation of a gapped clock with positive gapped clock and negative gapped clock portions.

FIG. 6 is a timing diagram depicting the generation of a gapped clock with positive gapped clock and negative gapped clock portions.

Figure 7:
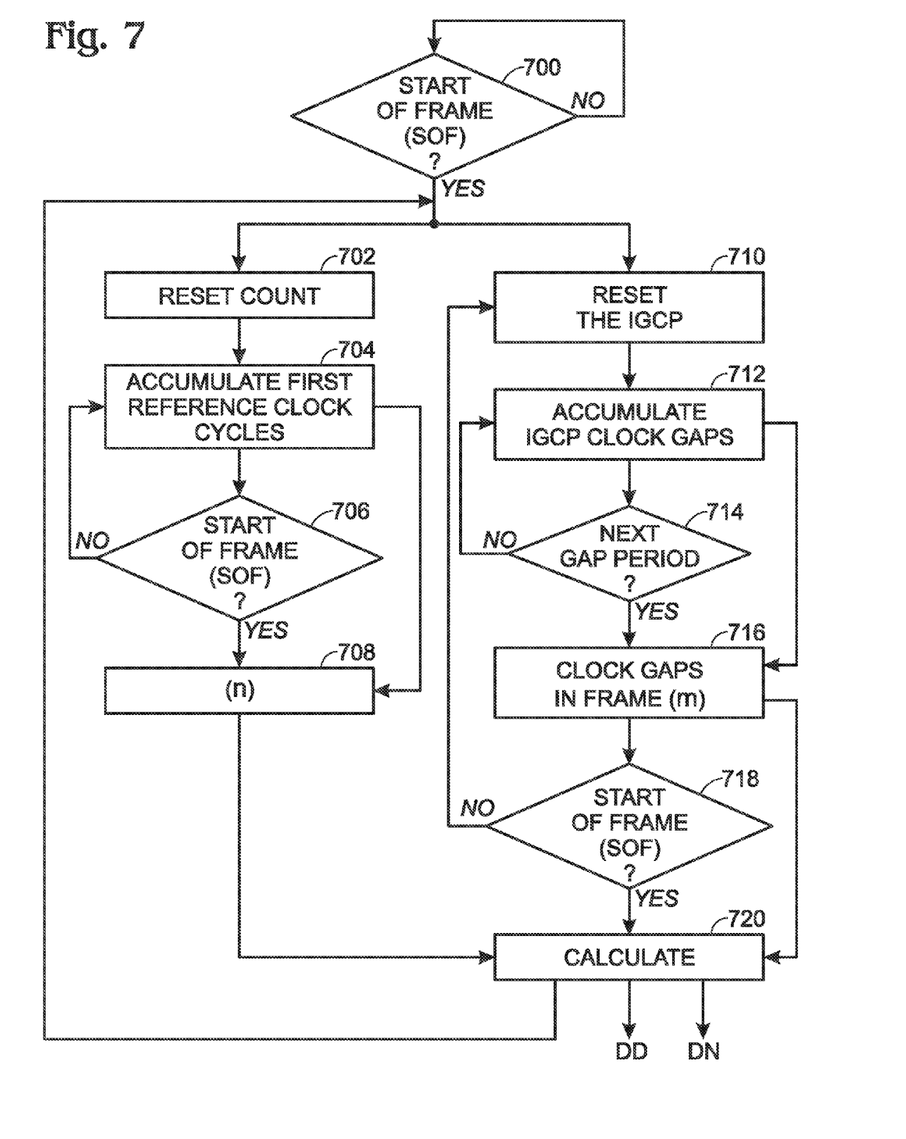
FIG. 7 is a gapped clock frequency acquisition flowchart.

FIG. 7 is a gapped clock frequency acquisition flowchart. The flowchart begins at Step 700. In Step 702 the first reference clock count is reset. In Step 704, a count of first reference clock pulses is accumulated. The count continues to accumulate until an SOF signal is encountered (Step 706). The count (n) is provided in Step 708. Simultaneously in Step 710, the IGCP gap counter is reset. In Step 712 a count of clock gaps is accumulated for each IGCP. The gap count for an entire frame is accumulated in Step 716. After an SOF signal (Step 718), Step 720 determines DD and DN.

Figure 8:
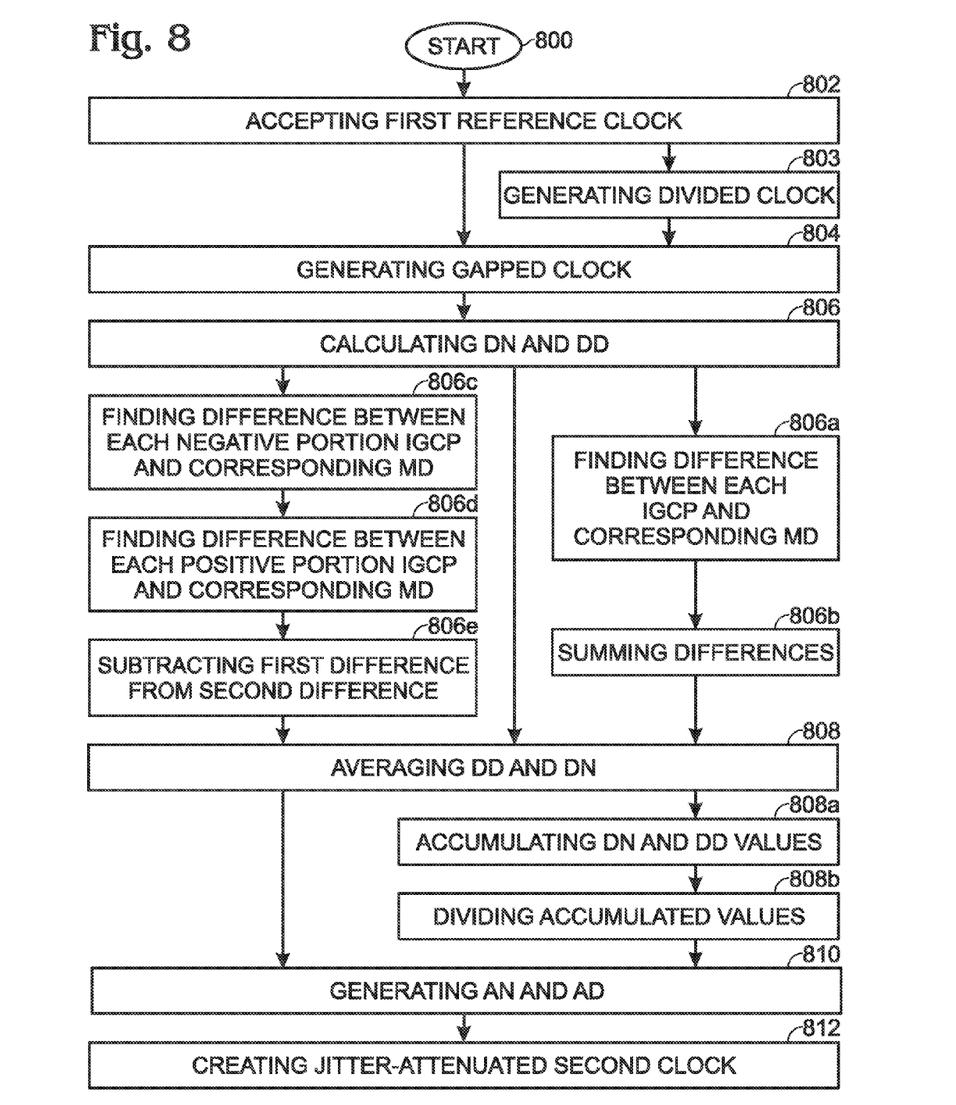
FIG. 8 is a flowchart illustrating a method for generating a jitter-attenuated clock using an asynchronous gapped clock source.

FIG. 8 is a flowchart illustrating a method for generating a jitter-attenuated clock using an asynchronous gapped clock source. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally, however, the steps are performed in numerical order. The method starts at Step 800.

In Step 802 a clock device accepts a first reference clock having a first frequency. As noted above, the first reference clock has (n) clock cycles per frame. Using the first reference clock, Step 804 generates an asynchronous gapped clock having an average second frequency less than the first frequency. Step 806 iteratively calculates a dynamic numerator (DN) and dynamic denominator (DD) for the gapped clock. Step 808 averages DN and DD. In response to the averaging, Step 810 generates an averaged numerator (AN) and an averaged denominator (AD). Step 812 multiplies the first frequency by a ratio AN/AD to create a jitter-attenuated second clock having the second frequency.

In one aspect, generating the gapped clock in Step 804 includes dividing (n) by an integer number (x) of instantaneous gap clock periods (IGCPs), where the total number of clock gaps in the (x) IGCPs is (m). In another aspect, averaging DN and DD in Step 808 includes substeps. Step 808a accumulates values of DN and DD over a plurality of (s) frames, and Step 808b divides the accumulated values by (s).

In another aspect, Step 803 generates a divided clock with a uniform minimum divide period of (MD). Then, iteratively calculating DN in Step 806 includes calculating:

(x)(MD)+(m)=(n), when (x)(MD)≥n; and, (x)(MD)−(m)=(n), when (x)(MD)<n.

More explicitly, iteratively calculating DN in Step 806 includes comparing the difference between (n) and (m) for each frame. Iteratively calculating DD in Step 806 includes determining (n) for each frame.

In one aspect, Step 804 generates a positive gapped clock having a lower frequency than the divided clock. Then, calculating the difference between (n) and (m) for each frame (Step 806) includes substeps. Over the period of a frame, Step 806a finds a difference in first reference clock pulses between each IGCP and a corresponding MD. Step 806b sums the differences to obtain the value (m). Likewise, Steps 806a and 806b are performed if Step 804 generates a negative gapped clock.

In another aspect, Step 804 generates a gapped clock with negative gapped clock portions having a higher frequency than the divided clock, and positive gapped clock periods having a lower frequency than the divided clock. Then over the period of a frame, Step 806c finds a difference in first reference clock pulses between each negative gapped clock portion IGCP and a corresponding MD, creating a first difference sum. Over the period of the frame, Step 806d finds a difference in first reference clock pulses between each positive gapped clock portion IGCP and a corresponding MD, creating a second difference sum. Step 806e subtracts the first difference sum from the second difference to obtain the value (m).

A system and method have been provided for generating a jitter-attenuated clock using an asynchronous gapped clock source. Some examples of circuitry and methodology steps have been given as examples to illustrate the invention. However, the invention is not limited to merely these examples. Likewise, the invention has been described in the context of binary numbers. However, the invention is not limited to any particular number base. Other variations and embodiments of the invention will occur to those skilled in the art.

We claim:

1. In a clock device, a method for generating a jitter-attenuated clock using an asynchronous gapped clock source, the method comprising:
   a clock device accepting a first reference clock having a first frequency;
   using the first reference clock, generating an asynchronous gapped clock having an average second frequency less than the first frequency;
   iteratively calculating a dynamic numerator (DN) and dynamic denominator (DD) for the gapped clock;

averaging DN and DD;
in response to the averaging, generating an averaged numerator (AN) and an averaged denominator (AD); and
multiplying the first frequency by a ratio AN/AD to create a jitter-attenuated second clock having the second frequency.

2. The method of claim 1 wherein accepting the first reference clock includes accepting a frame of (n) clock cycles; and
wherein generating the gapped clock includes dividing (n) by an integer number (x) of instantaneous gap clock periods (IGCPs), where the total number of clock gaps in the (x) IGCPs is (m).

3. The method of claim 2 wherein averaging DN and DD includes:
accumulating values of DN and DD over a plurality of (s) frames; and,
dividing the accumulated values by (s).

4. The method of claim 2 further comprising:
generating a divided clock with a uniform minimum divide period of (MD);
wherein iteratively calculating DN includes calculating:

$(x)(MD)+(m)=(n)$, when $(x)(MD) \geq n$; and, $(x)(MD)-(m)=(n)$, when $(x)(MD) < n$.

5. The method of claim 4 wherein iteratively calculating DN includes comparing the difference between (n) and (m) for each frame.

6. The method of claim 4 wherein iteratively calculating DD includes determining (n) for each frame.

7. The method of claim 4 wherein generating the gapped clock includes generating a positive gapped clock having a lower frequency than the divided clock; and,
wherein calculating the difference between (n) and (m) for each frame includes:
over the period of a frame, finding a difference in first reference clock pulses between each IGCP and a corresponding MD; and,
summing the differences to obtain the value (m).

8. The method of claim 4 wherein generating the gapped clock includes generating a negative gapped clock having a higher frequency than the divided clock; and,
wherein calculating the difference between (n) and (m) for each frame includes:
over the period of a frame, finding a difference in first reference clock pulses between each IGCP and a corresponding MD; and,
summing the differences to obtain the value (m).

9. The method of claim 4 wherein generating the gapped clock includes generating negative gapped clock portions having a higher frequency than the divided clock, and positive gapped clock periods having a lower frequency than the divided clock; and,
wherein calculating the difference between (n) and (m) for each frame includes:
over the period of a frame, finding a difference in first reference clock pulses between each negative gapped clock portion IGCP and a corresponding MD, creating a first difference sum;
over the period of the frame, finding a difference in first reference clock pulses between each positive gapped clock portion IGCP and a corresponding MD, creating a second difference sum; and,
subtracting the first difference sum from the second difference to obtain the value (m).

10. A system operable to generate a jitter-attenuated clock, the system comprising:
a gap clock generator operable to generate an asynchronous gapped clock at a first frequency that is less than a frequency of a received reference clock;
a gap frequency acquisition module coupled the gap clock generator operable to generate iteratively calculated dynamic numerator (DN) values and iteratively calculated dynamic denominator (DD) values for the gapped clock;
an averaging module coupled to the gap frequency acquisition module operable to receive the DN values and the DD values and generate an averaged numerator (AN) and an averaged denominator (AD); and
a synthesizer module coupled to the averaging module coupled operable to generate a jitter-attenuated clock at the first frequency by multiplying the reference clock frequency by a ratio of AN/AD.

11. The system of claim 10, wherein the gap clock generator accepts a reference clock with a frame of (n) clock cycles, and is further operable to generate the gapped clock by dividing (n) by an integer number (x) of instantaneous gap clock periods (IGCPs), wherein the total number of clock gaps in the (x) IGCPs is (m).

12. The system of claim 11, wherein the averaging module is further operable to accumulate values of DN and DD over a plurality of (s) frames, and divide the accumulated values by (s).

13. The system of claim 11, wherein the gap clock generator is further operable to supply a uniform minimum divide period of (MD) and to supply the value of (n) for each frame;
wherein the gap frequency acquisition module is further operable to generate a divided clock with the uniform minimum divide period (MD), and wherein the gap frequency acquisition module is further operable to calculate:

$(x)(MD)+(m)=(n)$, when $(x)(MD) \geq n$; and, $(x)(MD)-(m)=(n)$, when $(x)(MD) < n$.

14. The system of claim 13, wherein the gap frequency acquisition module is operable to iteratively calculate DN values by finding a difference between (m) and (n) for each frame.

15. The system of claim 13, wherein the gap frequency acquisition module is operable to iteratively calculate DD values by determining (n) for each frame.

16. The system of claim 13, wherein the gap clock generator is further operable to supply a positive gapped clock with a frequency lower than the divided clock, and wherein the gap frequency acquisition module is further operable, over the period of a frame, to find a difference in first reference clock pulses between each IGCP and a corresponding MD, and to sum the differences to obtain the value (m).

17. The system of claim 13, wherein the gap clock generator is further operable to supply a negative gapped clock with a frequency higher than the divided clock, and wherein the gap frequency acquisition module is further operable, over the period of a frame, to find a difference in first reference clock pulses between each IGCP and a corresponding MD, and to sum the differences to obtain the value (m).

18. The system of claim 13, wherein the gap clock generator is further operable to supply a gapped clock comprising a negative gapped clock portion with a frequency higher than the divided clock and a positive gapped clock portion with a frequency lower than the divided clock, and wherein the gap frequency acquisition module is further operable, over the period of a frame, to:
- find a first difference sum in first reference clock pulses between each negative gapped clock portion IGCP and a corresponding MD;
- find a second difference sum between each positive gapped clock portion IGCP and a corresponding MD; and
- subtract the first difference from the second difference to obtain the value (m).

* * * * *